(No Model.)

R. H. BROWN.
CALIPERS.

No. 288,770. Patented Nov. 20, 1883.

Witnesses:
A. Ruppert.
W. T. Cole.

Inventor:
Reuben H. Brown,
by W. T. Howard
atty.

UNITED STATES PATENT OFFICE.

REUBEN H. BROWN, OF NEW HAVEN, CONNECTICUT.

CALIPERS.

SPECIFICATION forming part of Letters Patent No. 288,770, dated November 20, 1883.

Application filed May 3, 1883. (No model.)

*To all whom it may concern:*

Be it known that I, REUBEN H. BROWN, of New Haven, in the county of New Haven and State of Connecticut, have invented certain new and useful Improvements in Calipers, of which the following is a specification, reference being had to the accompanying drawings.

This invention relates to improvements in the construction of calipers, whereby the instrument may be readily and conveniently adjusted to the required measurement with the greatest nicety.

Figure 1:
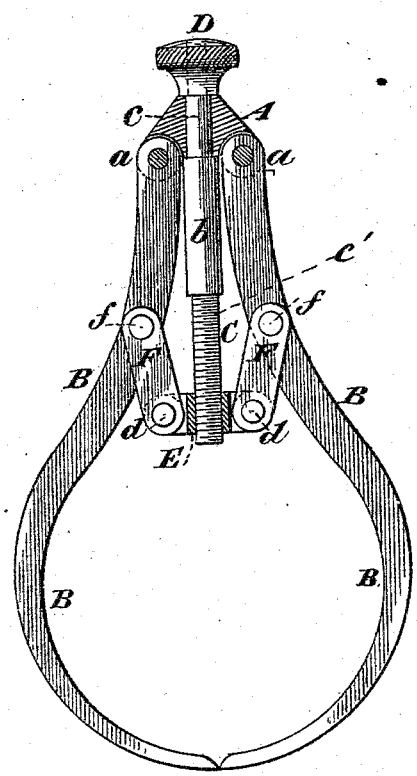
Figure 2:

In the accompanying drawings, Figure 1 is a side view of my improved calipers. Fig. 2 is an edge or end view of the same.

Similar letters of reference indicate similar parts in both views.

A is a block, to which the legs B B are hung or pivoted at $a$ $a$. The block A is perforated to receive the plain upper end $c$ of the screw-rod C, the said end revolving freely in the block. To the upper end of the screw-rod C is secured the head D, which may be milled upon its outer surface. The cylindrical portion $b$ of the screw-rod, which may also be milled, extends some distance from the under side of the block A, as shown, in order to give a sufficient surface for use, in addition to the means provided in the head D, in revolving the screw. The surface $b$ is conveniently adapted to be revolved when the operator wishes to employ only one hand in the use of the calipers, or under other circumstances where it may be inconvenient to revolve the head D. E is a nut, threaded to receive the threaded lower end, $c'$, of the screw-rod. To each end of the nut E is pivoted at $d$ a link, F, the outer ends of the links being pivoted to the legs B at $ff$.

The operation of the device will be readily understood. On turning the screw-rod by means of the head D or surface $b$, the links F are straightened, giving the required expansion to the instrument. By revolving the screw in the reverse direction the instrument is contracted.

I do not claim, broadly, the use of links in connection with the legs of calipers, and with a screw for expanding and contracting the instrument. Neither do I claim, broadly, the use, in connection with calipers, of a screw having rotation in an upper block and revolved by means of a button placed intermediately between the block and the nut; but

What I claim as my invention is—

In calipers, the block A, legs B, pivoted thereto, links F, and nut E, combined with the rod C, having the parts $c$, $b$, and $c'$, and head D, substantially as and for the purposes set forth.

In testimony whereof I hereunto set my hand and seal in the presence of two witnesses.

REUBEN H. BROWN. [L. S.]

Witnesses:
A. C. DEPEW,
JOHN N. AUSTIN.